United States Patent [19]

Seki et al.

[11] Patent Number: 5,504,922

[45] Date of Patent: Apr. 2, 1996

[54] VIRTUAL MACHINE WITH HARDWARE DISPLAY CONTROLLERS FOR BASE AND TARGET MACHINES

[75] Inventors: Yukihiro Seki; Hiromichi Itoh; Shigeo Tsujioka, all of Yokohama, Japan

[73] Assignee: Hitachi, Ltd., Tokyo, Japan

[21] Appl. No.: 300,863

[22] Filed: Sep. 6, 1994

Related U.S. Application Data

[63] Continuation of Ser. No. 546,737, Jul. 2, 1990, abandoned.

[30] Foreign Application Priority Data

Jun. 30, 1989 [JP] Japan ..................................... 1-166631

[51] Int. Cl.$^6$ ............................. G06F 3/037; G06F 13/12
[52] U.S. Cl. ..................... 395/800; 395/500; 395/375; 395/650; 395/600; 364/228.5; 364/263.2; 364/927.81; 364/938.1; 364/DIG. 2
[58] Field of Search ................................... 395/500, 600, 395/800, 375, 650

[56] References Cited

U.S. PATENT DOCUMENTS

| | | | |
|---|---|---|---|
| 4,727,480 | 2/1988 | Acbright et al. | 345/500 |
| 5,088,033 | 2/1992 | Binkley et al. | 395/500 |
| 5,093,776 | 3/1992 | Morss et al. | 395/500 |
| 5,131,089 | 7/1992 | Cole | 395/500 |
| 5,226,168 | 7/1993 | Kobayashi et al. | 395/800 |

OTHER PUBLICATIONS

Timothy Rice, "The Romar II, Competing With Apple on Price Alone", *Interface Age*, pp. 100–102 May 1984.
C. J. Thompson, "Eve II Well Built But Distribution is Still Limited", *Interface Age* May 1984 pp. 103–105.
Richard Alexander "Wildcat–A Promising Apple and CP/M Compatible Micro with Flaws" Interface Age, May 1984 pp. 106–107.
English abstract for Japanese Kokai 61-184643, Aug. 18, 1986.
English abstract for Japanese Kokai 62-279431, Dec. 4, 1987.
*80386 Programmer's Reference Manual*, Order No. 230985-001, Intel Corporation, pp. 15-1 to 15-13, 1986.
*80386 System Software Writer's Guide*, Order No. 231499-001, Intel Corporation, pp. 9-4 to 9-14, 1987.
E. Strauss, *80386 Technical Reference*, Brady Books, 1987, pp. 147–159, 188–199, and 479–503.
*386DX Microprocessor Data Sheet*, Order No. 231630-006, Intel Corporation, Apr. 1989, pp. 46–51 and 56–61.

*Primary Examiner*—Thomas G. Black
*Assistant Examiner*—Paul R. Lintz
*Attorney, Agent, or Firm*—Antonelli, Terry, Stout & Kraus

[57] ABSTRACT

A virtual machine for operating, on a base machine, applications software for a target machine. The virtual machine includes first display control hardware for the base machine, second display control hardware for the target machine, a virtual machine monitor for emulating the operation of the target machine by utilizing the second display control hardware for displaying operation, and a selector for selecting one of the first display control hardware and the second display control hardware depending on whether the virtual machine monitor is operable in a target machine mode or a base machine mode. The OS of the base machine is utilized for the virtual machine without modification.

13 Claims, 9 Drawing Sheets

VIRTUAL MACHINE WITH HARDWARE DISPLAY CONTROLLERS FOR BASE AND TARGET MACHINES

This application is a continuation of application Ser. No. 546,737 filed on Jul. 2, 1990, now abandoned.

BACKGROUND OF THE INVENTION

1. Field of the Invention

This invention relates to hardware of a virtual machine or computer which provides compatibility of programs between different kinds of personal computers, workstations, etc., having different architectures, and to a virtual machine monitor program which is software for controlling the hardware.

2. Description of the Related Art

As a result of originality on the part of manufacturers, there exist many different architectures in information processing machines such as personal computers. Here in this specification, the term "architecture" means the design and interaction of a memory map, an I/O map, LSIs, an OS function, a BIOS (Basic Input Output System) function, a keyboard, etc. Since the construction of hardware and software is different between different kinds of information processing machines, there is no compatibility between applications software developed independently for the respective kinds of information processing machines. Consequently, a user had to purchase another machine which can execute the applications software the user wishes to use. Otherwise the user had to modify or implement the applications software such that the same applications software is operable on the existing machine.

To this end, various attempts have hitherto been made, as virtual machines, on large-scale computers to provide compatibility of a particular kind of machine (called a "base machine" here in this specification) with another kind of machine (called a "target machine" here in this specification) having a different architecture. As advances have recently been made in, for example, LSI technology, the applications of virtual machines even to personal computers has been on the rise.

For realizing a virtual machine on a personal computer, it is needed to emulate function calls for at least the OS and the BIOS. Japanese Patent Laid-Open Publication No. 61-184643 discloses a method of emulating a system call using a privileged instruction.

In personal computers, it has been a common practice to directly access a display control section by applications software in is order to perform the processing at high speed. Therefore, regarding the display control section, it is necessary to emulate the hardware of a target machine by some means. A method for emulating I/O operation is disclosed in Japanese Patent Laid-Open Publication No. 62-279431. Further, a method for emulating the display control section of a target machine by using the display control section of a base machine is described in, for example, a magazine named Nikkei Byte (hereinafter called "Nikkei Byte"), October issue, pages 140–150, published October 1987, by Nikkei Business Publishing, Inc.

However, with the method for emulating the I/O operation of the display system by software, the number of steps of a program would increase to lower the performance due to the reduced processing speed.

In addition, with the method for emulating the display control section of a target machine by the display control section of a base machine, all functions which can be realized would be limited to the display functions of the base machine. For example, there would be limited the number of colors to be displayed, the number of dots on the screen, or so-called character attributes such as underline and inverting.

For a solution to this problem, the Nikkei Byte June issue, pages 85–86, published June 1988, and the Nikkei Byte July issue, pages 110–111, published July 1988, disclose technical concepts of providing, in addition to the display control section of a base machine, the display control section of a target machine in hardware and switchably using these two display control sections. With this prior method, however, the OS of the base machine could not be used as it was but, rather, it was necessary to prepare a new OS.

SUMMARY OF THE INVENTION

It is therefore an object of this invention to improve the compatibility of a base machine with a target machine and to provide a display control method for a virtual machine with less degradation of the performance by adding minimal hardware.

Another object of the invention is to provide a virtual machine for operating applications software for a target machine, without modifying the OS of a base machine.

Still another object of the invention is to provide a virtual machine for emulating, on a keyboard for a base machine, the operation of a keyboard for a target machine.

When realizing a virtual machine for operating, on a base machine, applications software for a target machine, the display control section is the most significant in performance to users, and many applications software now on the market directly access the display control section in an effort to improve the performance. To this end, the virtual machine of this invention is equipped with, in addition to the display control section for a base machine, the display control section for a target machine in hardware; switching is performed between the two display control sections according to the operation mode of the virtual machine. With this arrangement, the display function of the target machine can be completely realized, and emulation is not entirely performed by software, thereby providing less degradation of performance.

Further, the OS of the base machine is utilized as it is. If a BIOS call or an I/O access is issued, its instruction address is obtained, and then a decision is made on whether the instruction address is within the OS area or the applications software area, and as a result, a virtual machine monitor determines whether the emulation process should be performed or not.

The operation of a key which exists in the target machine keyboard but does not exist in the base machine keyboard can be achieved by depressing a combination of two or more keys of the base machine keyboard.

Specifically, the virtual machine monitor, which is software for controlling the virtual machine, has two operation modes: a base machine mode and a target machine mode. When operating in the base machine mode, emulation is not needed, and the virtual machine monitor will do nothing. Therefore, the virtual machine monitor may be omitted.

To the contrary, when operating in the target machine mode, the virtual machine monitor emulates the function requests of the OS and the BIOS issued from the applications software developed for the target machine and also performs emulation on the I/O device which is directly accessed by the applications software. For example, since upon issuance of a BIOS call, its instruction address is put on a stack, an exception processing section obtains the address. If the address is located in a user area in which applications software for a target machine is present, emulation processing should preferably be performed. Then the OS of the base machine may be used without any modification.

The display control will now be described. In this invention, both the display control section for a base machine and the display control section for a target machine are provided in hardware. This hardware generally includes a display memory, a display controller, a character generator, an attribute controller, etc. The virtual machine monitor exclusively selects one of the two display control sections depending on the operation mode at that time. Here, the term "selection" means switching display signals outputted from the respective display control sections to transfer the switched display signal to the display device, and switching the address map of the display memory and the display I/O devices. The selection of the operation mode may be carried out by setting predetermined data in an ordinary I/O register or the like.

Once the virtual machine monitor has successively performed switching of the display control sections, the same display hardware as that of the target machine is provided, for applications software for the target machine. As a result, it is possible to execute the applications software for the target machine, without any modification.

The memory and I/O areas occupied by the display control section of the target machine might overlap those of the base machine. In such a case, the display control section for the target machine is preferably relocated in such an area as not to overlap that of the base machine. Although this would be incompatible with the target machine as observed from the applications software, it can be overcome by address translation. Like the switching of the display control sections, the address translation may be selected based on the operation mode of the virtual machine monitor. The address translation may be realized by switching the address signals by hardware, or by producing an exception to perform an emulation by software.

Further, by producing a key code similar to a key which exists in the keyboard of the target machine through depressing a plurality of keys of the keyboard of the base machine, it is possible to emulate the key operation. The key code emulation may be performed by a microcomputer built in the keyboard or by a keyboard BIOS.

The above and other advantages, features and additional objects of this invention will be manifest to those versed in the art upon making reference to the following detailed description and the accompanying drawings in which a preferred embodiment incorporating the principles of this invention is shown by way of illustrative example.

DETAILED DESCRIPTION OF PREFERRED EMBODIMENT

Figure 1:
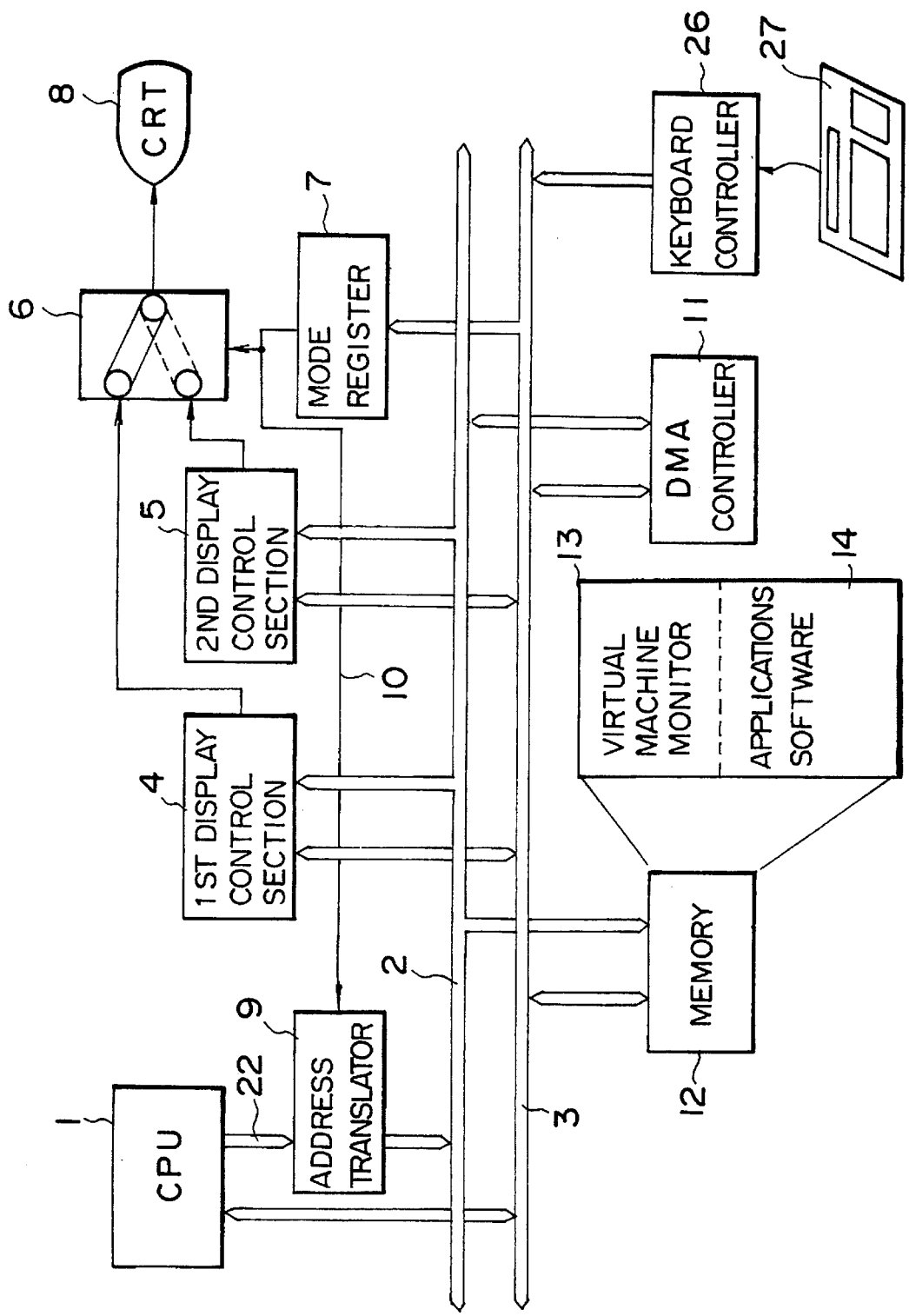
FIG. 1 is a hardware block diagram showing a virtual machine embodying this invention.

The principles of this invention are particularly useful when embodied in a virtual machine such as shown in FIG. 1.

In FIG. 1, reference numeral 1 designates a CPU; 2, an address bus; 3, a data bus; 4, a first display control section for a base machine; 5, a second display control section for a target machine; 7, a mode register in which a virtual machine monitor sets the operation mode; 6, a selector for selecting a display signal according to a predetermined value and transferring the display signal to a CRT 8; 9, an address translator for performing address translation by hardware; and 10, a mode signal which is a value set in the mode register 7. A virtual machine monitor 13 and applications software 14 are disposed in a memory 12. In the illustrated embodiment, either the applications software for the base machine or the applications software for the target machine is present in the memory 12. Whether the application software loaded into the memory 12 is for the base machine or the target machine can be recognized automatically by the virtual machine monitor according to a user's instruction or the object from which the applications software is read out.

When the applications software 14 is for the base machine, the selector 6 selects a display signal from the first display control section 4 according to a predetermined value of the mode register 7 set by the virtual machine monitor 13, and the address translator 9 outputs the address in through state to the address bus 2 without any address translation. Softwarewise, the virtual machine monitor 13 does not perform emulation of, for example, a BIOS function and may simply use the functions possessed by the base machine.

To the contrary, when the applications software 14 is for the target machine, the virtual machine monitor 13 sets the target mode in the mode register 7, and the selector 6 is caused to select a display signal from the second display control section 5. Further, the address translator 9 performs address translation to translate an I/O map. During the time the applications software for the target machine is present in the memory 12, the target mode set in the mode register 7 will not be changed, no matter whether the instruction address from which a BIOS call or an I/O access has been issued is located within the system area or the user area. This is to prevent the display screen from being disordered due to such change. Therefore, in the target mode, the OS will utilize the second display control section 5. For this purpose, the virtual machine monitor 13 includes the emulating function which allows the OS of the base machine to utilize the second display control section 5 for the target machine.

Figure 2A:
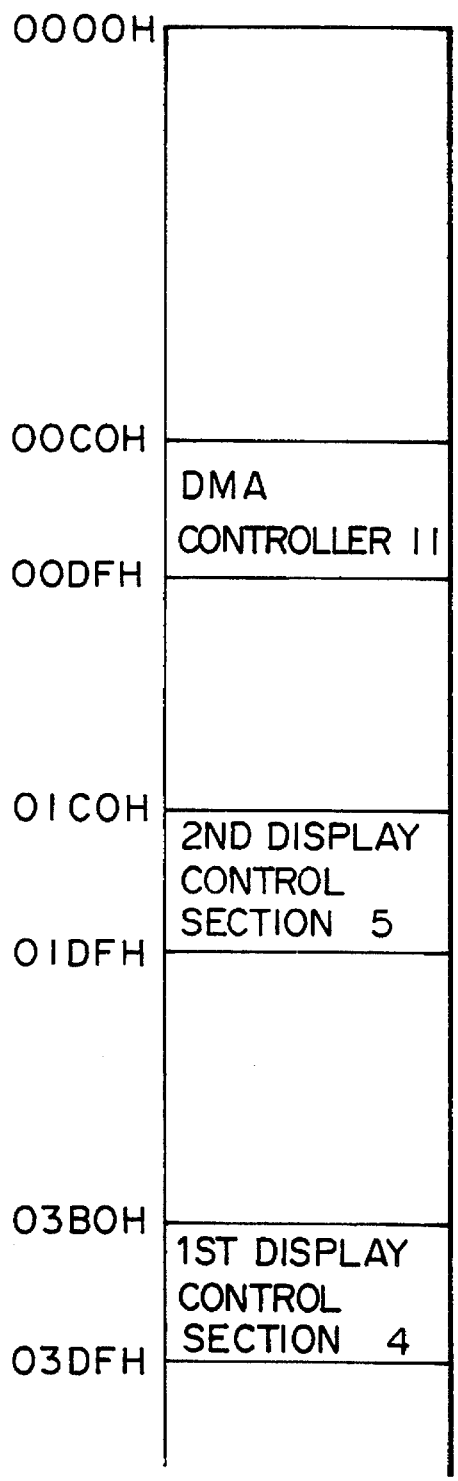
FIGS. 2(a)–2(b) are diagrams showing examples of an I/O map.
Figure 2B:
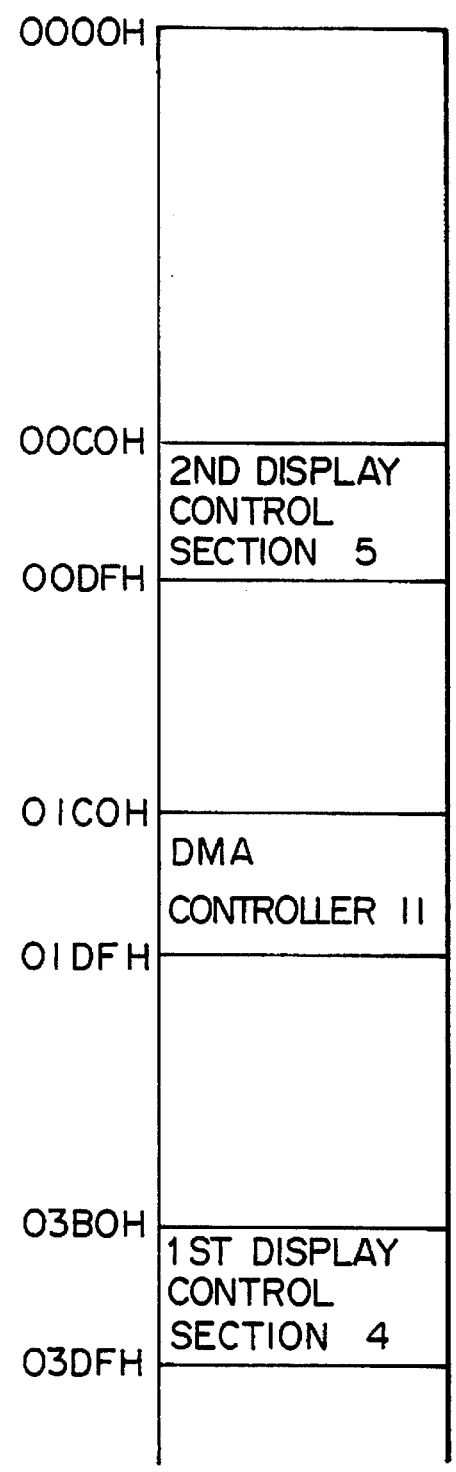

FIG. 2(a) shows one example of an I/O map and is a physical map in which a DMA controller 11 is mapped at the addresses of 00COH to 00DFH (letter "H" represents a hexadecimal number). The display I/O devices of the first display control section 4 for the base machine are mapped at the addresses of 03BOH to 03DFH. The applications software 14 for the base machine has been prepared, depending on this I/O MAP. On the contrary, assuming that the display I/O devices of the target machine are originally mapped at the addresses of 00C0H to 00DFH as shown in FIG. 2(b), the addresses of the DMA controller 11 and the I/O addresses will overlap each other if the display I/O devices are connected with the base machine of this example. To this end, as shown in FIG. 2(a), the display I/O devices should be disposed at the addresses of 01C0H to 01DFH, which is an empty or blank area on the base machine.

Figure 3:
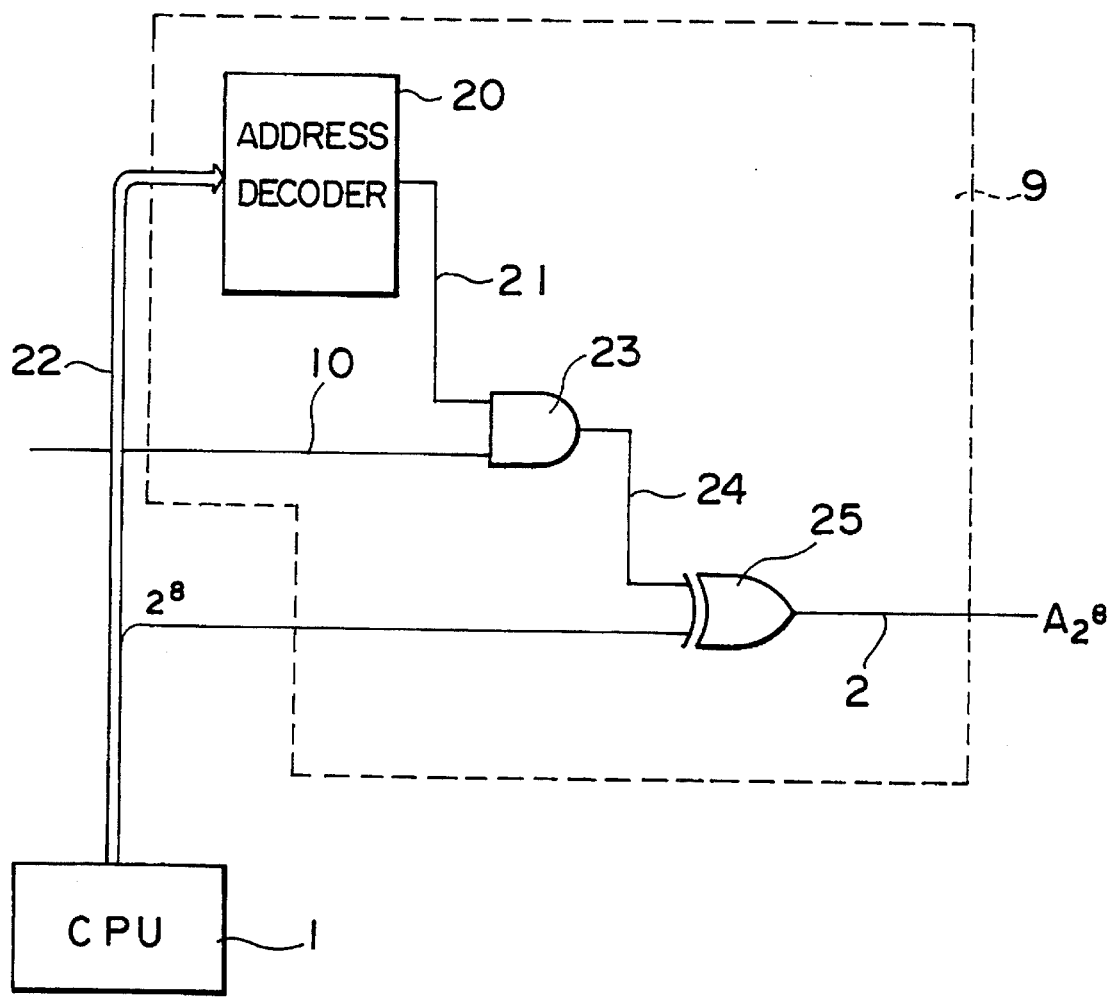
FIG. 3 is a diagram showing one example of an address translator.

FIG. 3 shows one example of the address translator 9. When an address of 00CH0 to 00DFH is accessed, an address decoder 20 will decode an address signal 22 outputted from the CPU 1 to activate a decoded signal 21. If the operation mode of the virtual machine monitor 13 is the target mode, the mode signal 10 will be active. Then an inverting signal 24 will be made active by an AND gate 23 so that the ninth bit $A2^8$ of the CPU address 22 outputted from the CPU 1 is inverted by an exclusive OR gate 25. Regarding the other address bits, the CPU address 22 will remain as it is on the address bus 2. By this operation, the addresses of 00C0H to 00DFH and the addresses of 01C0H to 01DFH are exchanged with each other. At that time, as viewed from the applications software 14, the logical I/O map will be as shown in FIG. 2(b), thus providing compatibility with the original addresses of the second display control section 5. In the applications software 14 for the target machine, since the DMA controller 11 of the base machine is not used, there is no problem if the I/O address is changed.

Figure 4:
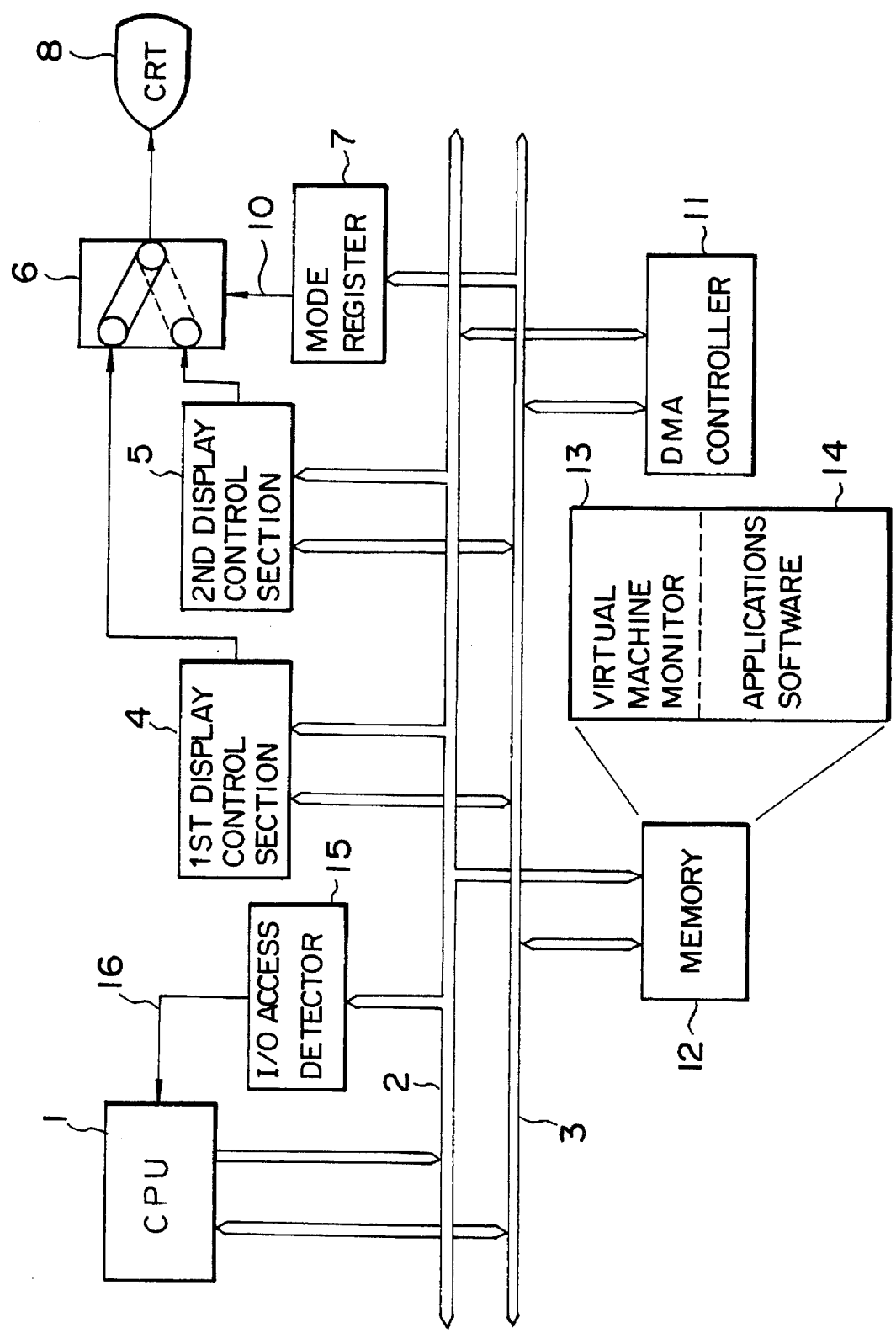
FIG. 4 is a hardware block diagram similar to FIG. 1 showing the manner in which address translation is performed by software.

In the foregoing example, address translation is performed by hardware. Alternatively, address translation may be performed by software as shown in FIG. 4. In FIG. 4, reference numeral 15 designates an I/O access detector which outputs an exception signal 16 when there is an access to an I/O address of 00C0H to 00DFH. When an exception signal 16 is inputted to the CPU 1, an exception handling routine contained in the virtual machine monitor 13 is started. Like reference numerals designate similar elements in FIGS. 1 and 4.

Figure 5:
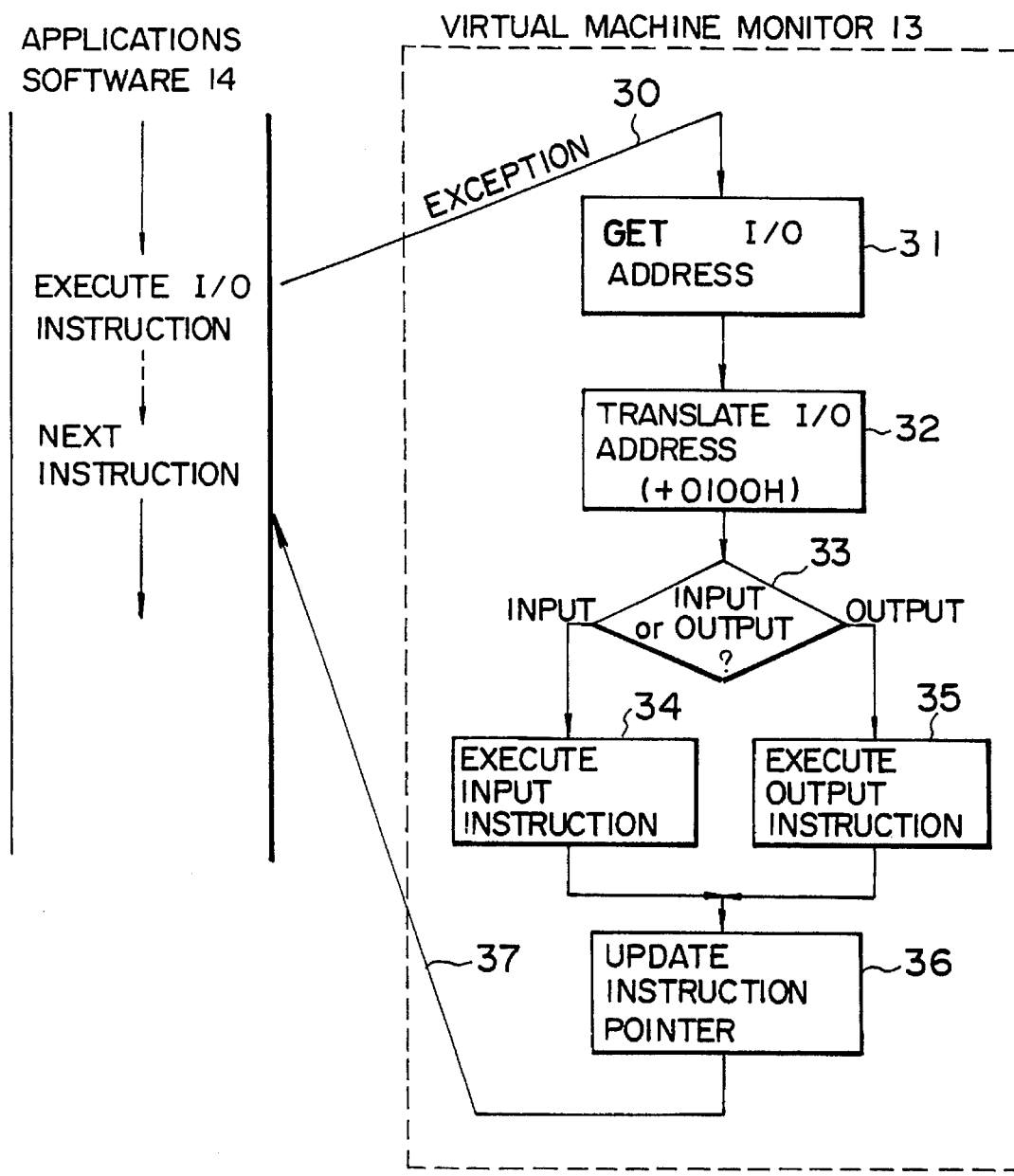
FIG. 5 is a flowchart showing an exception handling routine.

FIG. 5 shows one example of the exception handling routine. Upon receipt of the exception signal 16, the CPU 1 transfers control to the exception handling of the virtual machine monitor 13 (step 30). Firstly, an I/O address is obtained (step 31) which was intended to be accessed from an applications instruction from which an exception is created. As described below, the I/O address will be recognized upon reading the exception producing addresses that are stacked on a stack area. Then, in this example, this address is translated (step 32) by adding 100H, and an I/O access is performed (steps 34 and 35) according to input or output (step 33). Finally, an instruction pointer of the CPU 1 is advanced (step 36) so as to point at the instruction next to the I/O instruction, and control is returned to the applications software 14 (step 37). The performance with the translation by software will be lowered more than that by hardware. But since this translation is as simple as an address translation, its degree of performance reduction is small, compared to the emulation that is disclosed in the prior art publications.

In this example, the display I/O of the display control section 5 and the DMA controller 11 overlap each other. If, however, this overlapping can be avoided by a combination of the base machine and the target machine, address translation is not needed so that the address translator 9 and the I/O access detector 15 as well as the exception handling routine will become unnecessary.

This invention can be applied when translating a memory map similarly to translating the I/O map. When translating a memory map, the address translator 9 may be either the hardware of FIG. 3 or an MMU (Memory Management Unit).

Further, the I/O access detector 15 may be hardware such as merely an address decoder 20, or an exception producing function which produces an exception with an I/O access in the "virtual 86 mode" of 386DX/386SX, i486 of a CPU manufactured by Intel Corp., U.S.A.

Because of the low access frequency or the like, portions may be omitted from the second display control section 5 to reduce the hardware scale to a minimum sufficient for emulation, unless there would be any problem in compatibility and performance when they are emulated by software.

The manner in which the applications software 14 for the target machine is operated with the OS of the base machine will now be described.

Figure 6:
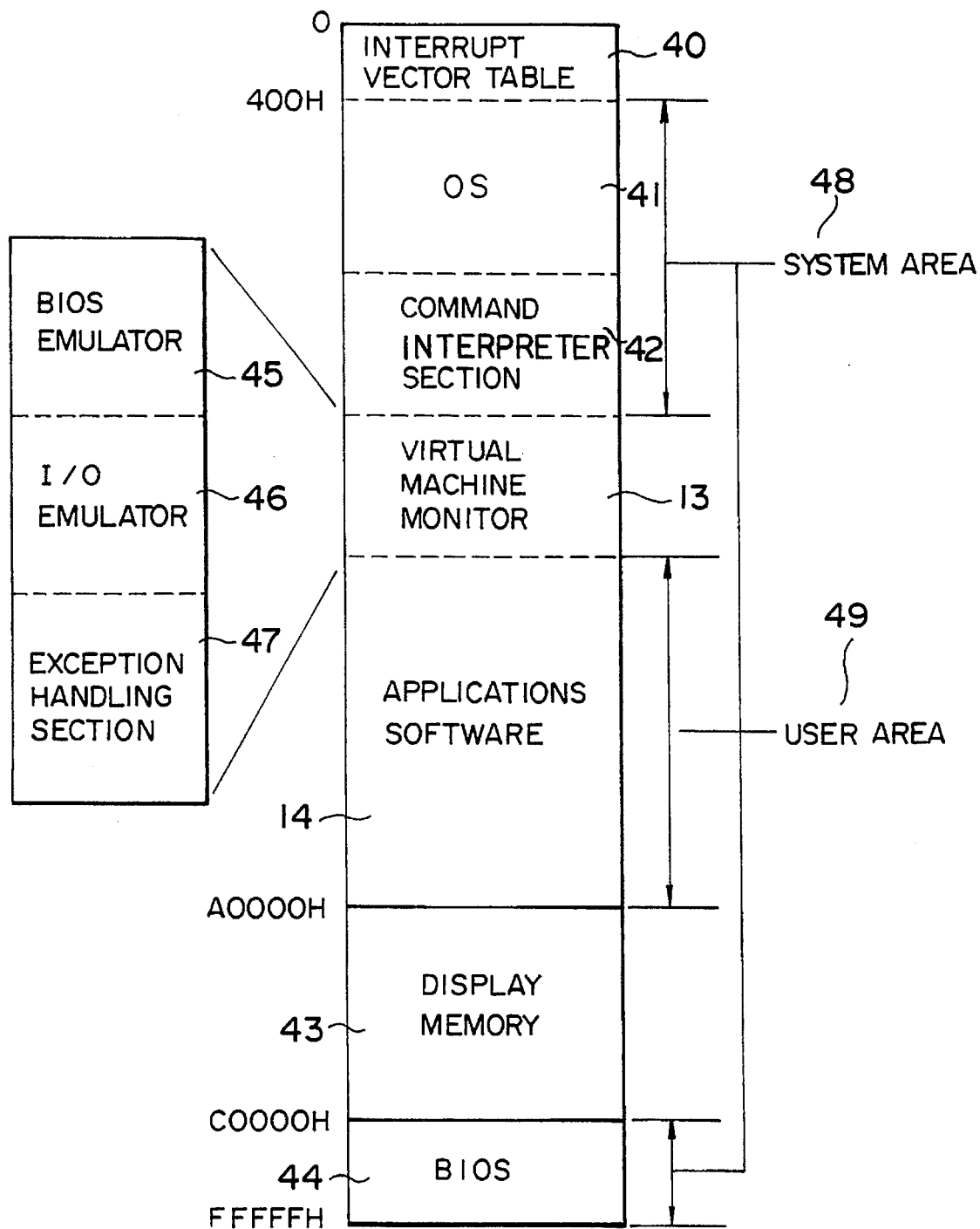
FIG. 6 is a diagram showing one example of an address map of a memory.

FIG. 6 shows a detailed memory map of the memory 12. In FIG. 6, reference numeral 40 designates an interrupt vector table; 41, the OS for the base machine; 42, a command interpreter section for interpreting the user's input information and assigning the control to OS 41; 13, a virtual machine monitor; 14, applications software for the target machine; 43, a display memory included in the second display control section 5; and 44, a BIOS for the base machine. The virtual machine monitor 13 comprises a BIOS emulator 45, an I/O emulator 46 and an exception handing section 47. When performing address translation by software, the I/O address translator of FIG. 5 is included in the I/O emulator 46.

Firstly, the operation of BIOS 44 will be described. BIOS 44 is control software for providing basic functions such as one-character output or one-character input. Here in this example, one-character input is performed from the keyboard. The register and the instruction code as well as the CPU 1 may be compatible with 8086 of Intel Corp., U.S.A.

Now assume that the one-character input from the keyboard of the target machine is as follows:
 BIOS function (software interrupt):
  INT 16H (instruction code CD 16H)
 Input parameter: AH register=00H
 Output parameters:
  AL register=character code (ASCII)
  AH register=scan code of the keyboard for the target machine.

This function call is issued from the applications software 14 of FIG. 6.

Further, the one-character input from the keyboard of the base machine is as follows:
 BIOS function (software interrupt):
  INT 16H (instruction code CD 16H)
 Input parameter: AH register=10H
 Output parameters:
  AL register=character code (ASCII)
  AH register=scan code of the keyboard for the base machine.

This function call is issued from the OS 41 of FIG. 6.

Figure 7:
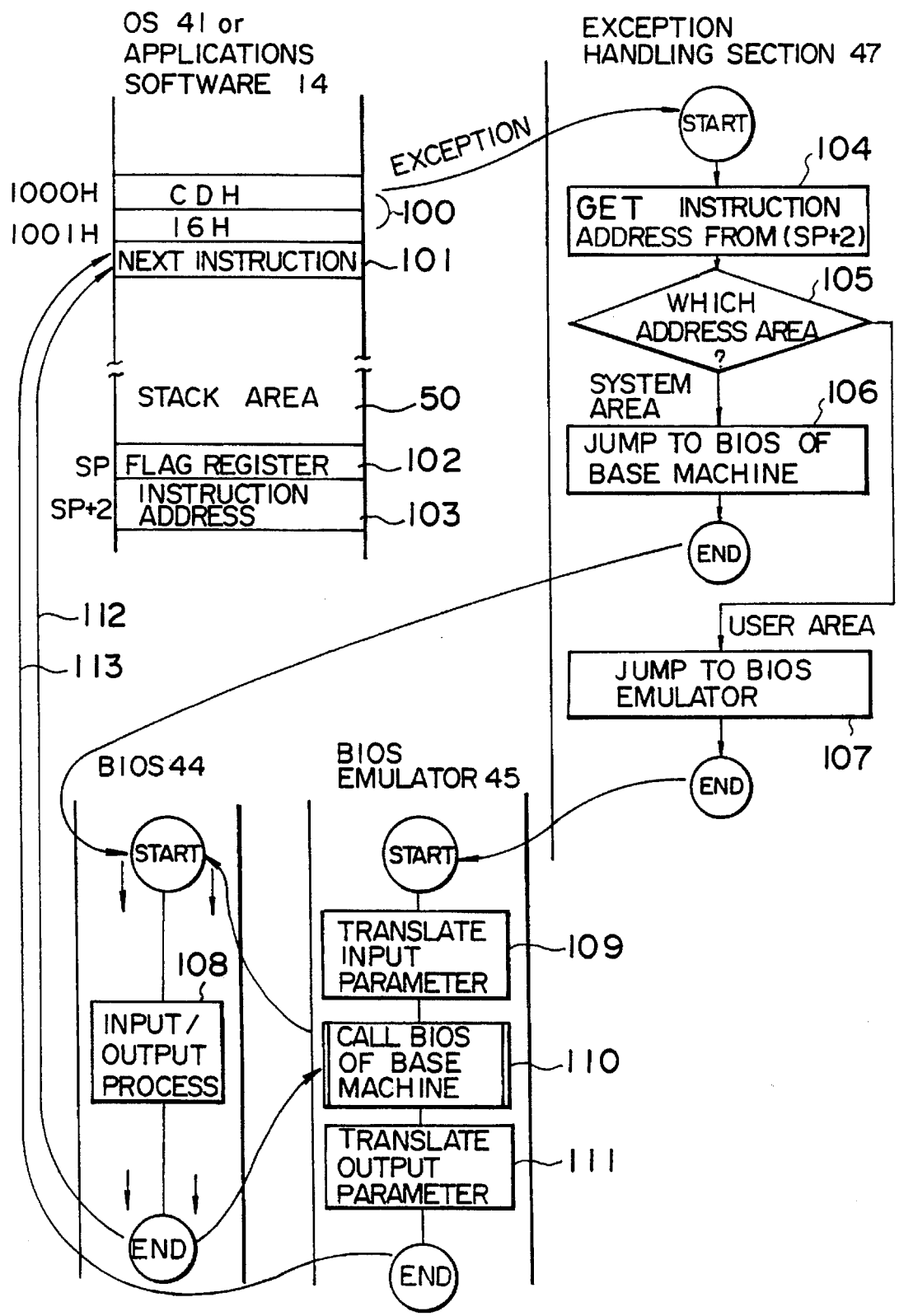
FIG. 7 is a flowchart showing one example of BIOS emulation.

Generally, the entry point address of BIOS 44 is registered in the interrupt vector table 40. When an INT 16H instruction is issued, the routine jumps to BIOS 44 with reference to the '16H'th content of the table. In the BIOS 44, an appropriate process is selected based on the input parameter. However, in the virtual machine system, it is necessary to process the same function in one system with different functions (input parameters) as described above. FIG. 7 shows one example of the flow of process of the virtual machine monitor 13.

Firstly, the address of the exception handling section 47 of the virtual machine 13 is registered beforehand in the interrupt vector table 40. Assuming that OS 41 or the applications software 14 executes (step 100) INT 16H (instruction code CD16H) from the address 1000H for a BIOS call, the control will be transferred to the exception handling section 47. At that time, the CPU 1 saves in a stack area 50 of the memory 12 an instruction address 103 and the content of a flag register 102 which shows the internal state of the CPU 1.

At the exception handling section 47, the instruction address 103 is obtained (step 104) from the stack area 50 based on the content of the SP register (not shown) which stores the stack address. Then a judgment is made (step 105) on whether this value falls within the system area 48 or within the user area 49 as shown in FIG. 6. Partly since the address area of the virtual machine monitor 13 per se intervenes between the system area 48 and the user area 49 in FIG. 6, this judgment can be made with ease. In this or any other case, if the address ranges of the system area 48 and the user area 49 are known beforehand, the discrimination of the area is easily carried out. Then, if the instruction address is within the system area 48 meaning that the BIOS call is issued from OS 41, the routine jumps (step 106) to BIOS 44 as usual. If the instruction address is within the user area 49 meaning that the BIOS call is issued from the applications software 14 for the target machine, the routine jumps (step 107) to BIOS emulator 45.

For example, in the case of one-character input, while the BIOS call from the applications software 14 for the target machine causes the AH register to be 00H, the BIOS emulator 45 converts the AH register to be 10H through input parameter translation (step 109) to translate the BIOS call of the target machine into a BIOS call of the base machine. Subsequently, the BIOS 44 of the base machine is called (110), the values of the AL and AH registers are translated through the output parameter translation (step 111) to absorb any difference of the key codes (character code and/or scan code).

Thus, through judging at the exception handling section 47 the address at which the BIOS call is issued, it is possible to process different functions with a common call interface.

If the keys corresponding to those of the keyboard for the target machine exist in the keyboard for the base machine, the differences in key code can be absorbed by the BIOS emulator 45. If a corresponding key does not exist in the keyboard for the base machine, it can be covered by the following alternative operation.

Figure 8A:
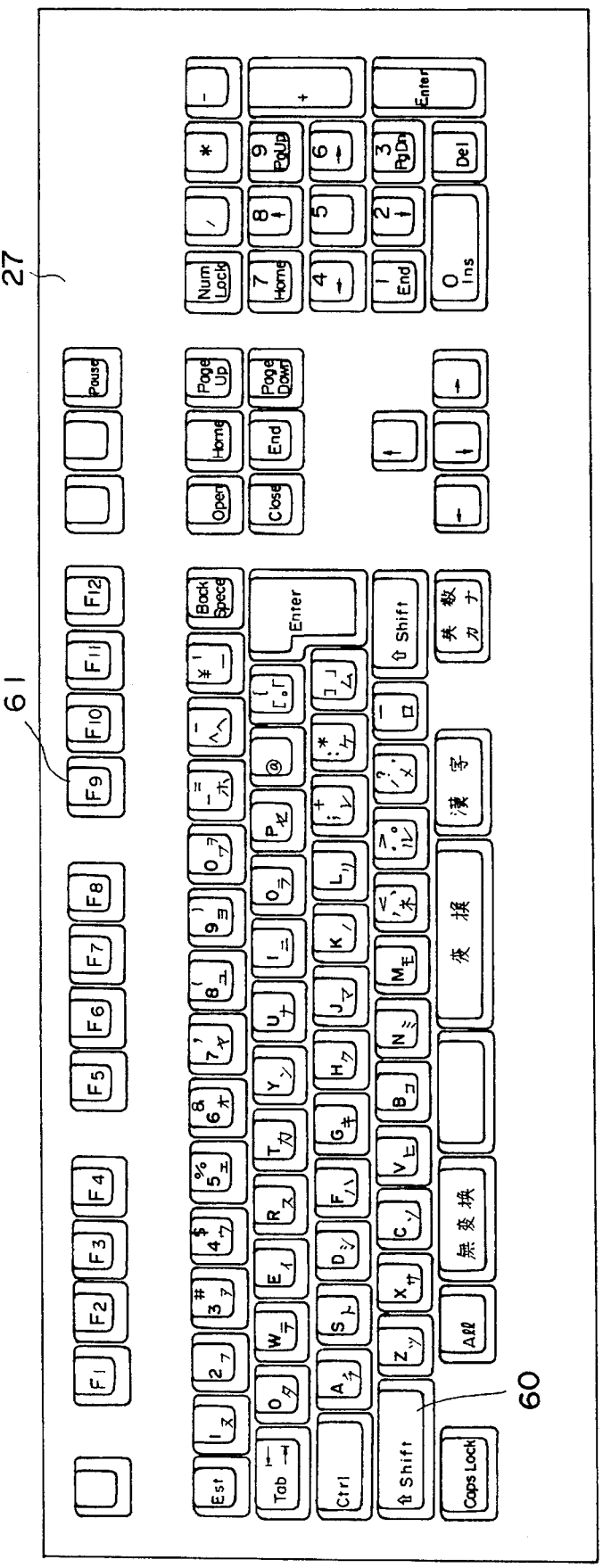
FIGS. 8(a)–8(b) are plan views showing a keyboard.
Figure 8B:
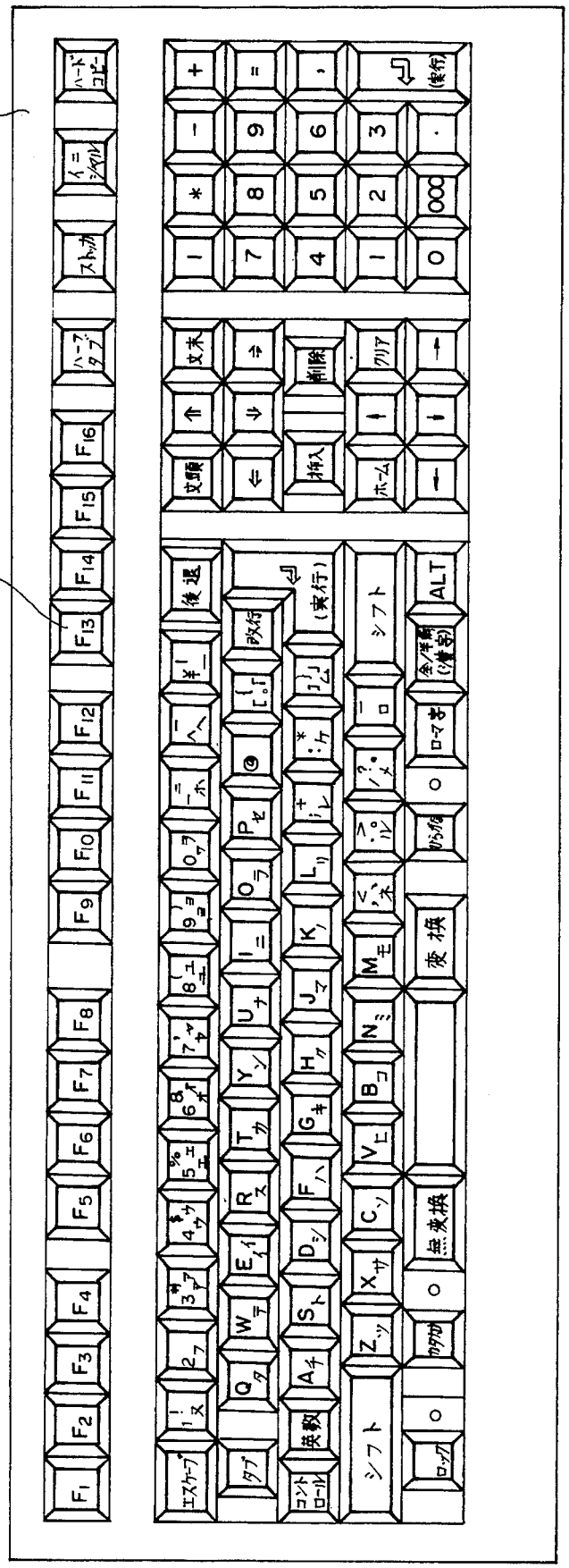

In FIG. 1, the keyboard controller 26 is connected to the data bus 3. The keyboard 27 for the base machine is connected to the keyboard controller 26. FIGS. 8(a) and 8(b) respectively show the keyboard 27 for the base machine and a keyboard 28 for the target machine. The keyboard 28 for the target machine has, for example, sixteen function keys F1 through F16 in the uppermost row, but the keyboard 27 for the base machine has only twelve function keys F1 through F12. Consequently, when emulating the F13 function key 62 of the keyboard 28 for the target machine by operating the keyboard 27 for the base machine, it is necessary to realize the emulation by a combination of two or more keys. For the same operation as the F13 function key, for example, with a shift key 60 depressed, the F9 function key 61 is depressed.

Now assume that the key codes of the F13 key of the keyboard 28 for the target machine are:

Character code=00H

Scan code=8CH and assume that the key codes of the shift key 60 plus the F9 key 61 in the keyboard 27 for the base machine are:

Character code=00H

Scan code=5CH

In the output parameter translation 111 of the above described BIOS emulator 45, this code (5CH) is replaced by the key code 8CH for the target machine to return the value to the applications software 14 for the target machine so that the compatibility of the key input can be maintained.

The same way of thinking as the foregoing description concerning the operation of the BIOS emulator 45 and the keyboard 27 can also be applied to the operation of the I/O emulator 46. For example, in the I/O emulation of FIG. 5, if the exception producing address falls within the user area, address translation may be performed to access the second display control section 5.

Although in the illustrated example, the applications software to be loaded on the memory is for the target machine or the base machine, both kinds of applications software may exist in the memory at the same time so that the operation mode can be switched between the target machine mode and the base machine mode according to the address.

The operation of the keyboard may be performed by an alternative combination of keys, without using the shift key 62 as shown in FIG. 8(a).

In this example, the CPU 1 is compatible with the 8086, but may be a CPU having a different architecture.

According to this invention, since the virtual machine is realized by using the display control hardware of the target machine without any change, it is possible to improve the compatibility of the display function. Even when the addresses overlap between the base machine and the target machine, such overlapping can be prevented by performing address translation. If hardware is used in such translation, there would be no lowering of performance. In that case, the addresses are compatible from the view point of the applications software.

Further, according to this invention, emulation of, for example, OS and BIOS functions can be easily realized only by judging its address, without preparing a new OS. Also, regarding the keyboard operation, emulation of the keyboard for the target machine is possible by a combination of two or more keys. In addition, by translating the key code, it is possible to maintain the compatibility with the applications software for the target machine.

What is claimed is:

1. A virtual machine for operating, on a base machine, applications software for a target machine, said virtual machine comprising:

a central processing unit;

an operating system, for the base machine, for causing said central processing unit to operate;

first display control hardware for the base machine;

second display control hardware for the target machine;

a virtual machine monitor operable on said central processing unit while said central processing unit is operating under said operating system, the virtual machine monitor having a target machine mode for selectively emulating operation of the target machine executing said applications software by utilizing said second display control hardware for a displaying operation, and having a base machine mode for not emulating operation of the target machine executing said applications software; and selecting means for selecting one of an output of said first display control hardware and an output of said second display control hardware depending on whether said virtual machine monitor is operating in the target machine mode or the base machine mode and outputting the selected output such that the selected output is available to be supplied to one display device.

2. A virtual machine according to claim 1, further comprising address translating means for translating an address outputted from said central processing unit and for accessing said second display control hardware with the output of said address translating means.

3. A virtual machine according to claim 2, wherein said address translating means is capable of translating addresses in a memory area in said second display control hardware which area is located in a memory space of said central processing unit.

4. A virtual machine according to claim 2, wherein said address translating means is capable of translating addresses in an I/O area in said second display control hardware which area is located in an I/O space of said central processing unit.

5. A virtual machine according to claim 2, wherein said address translating means is capable of performing address translation by operating, in hardware, on address signals outputted from said central processing unit.

6. A virtual machine according to claim 2, further comprising access detecting means for detecting an access to said second display control hardware, said address translating means being located in said virtual machine monitor for serving as an exception handling routine to perform the address translation, whereby said exception handling routine in said virtual machine monitor is started by said access detecting means to perform the address translation.

7. A virtual machine according to claim 1, further comprising one display device for receiving the output of said selecting means.

8. A virtual machine according to claim 1, further comprising key code translating means for translating a key code of a keyboard for the target machine into a key code of a keyboard for the base machine.

9. A virtual machine according to claim 1, further comprising key code allocating means for allocating the key code of a particular key of a keyboard for the target machine to a key code obtained by simultaneously designating a plurality of keys of a keyboard for the base machine.

10. A virtual machine for operating, on a base machine, applications software for a target machine, said virtual machine comprising:

a central processing unit;

an operating system, for the base machine, for causing said central processing unit to operate;

a virtual machine monitor operable on said central processing unit, while said central processing unit is operating under said operating system, for selectively emulating an I/O operation of the target machine executing said applications software;

means for causing said central processing unit to generate an exception by detecting an I/O access request originating from an instruction; and means for storing address information concerning an address of the instruction from which the I/O access request resulting in the generation of the exception originated;

wherein said virtual machine monitor includes exception handling means for causing emulation of the I/O operation not to be carried out for the I/O access request if the address information concerning the address of the instruction from which the I/O access request resulting in the generation of the exception originated corresponds to an address in a system area which includes the operating system, and for causing emulation of the I/O operation to be carried out for the I/O access request if the address information concerning the address of the instruction from which the I/O access request resulting in the generation of the exception originated corresponds to an address in a user area which includes the applications software.

11. A virtual machine for operating, on a base machine, applications software for a target machine, said virtual machine comprising:

a central processing unit;

an operating system, for the base machine, for causing said central processing unit to operate;

a virtual machine monitor operable on said central processing unit, while said central processing unit is operating under said operating system, for selectively emulating an I/O operation of the target machine executing said applications software;

means for causing said central processing unit to generate an exception by detecting a software interrupt instruction; and means for storing address information concerning an address of the software interrupt instruction resulting in the generation of the exception;

wherein said virtual machine monitor includes exception handling means for causing emulation of the I/O operation not to be carried out for the software interrupt instruction if the address information concerning the address of the software interrupt instruction resulting in the generation of the exception corresponds to an address in a system area which includes the operating system, and for causing emulation of the I/O operation to be carried out for the software interrupt instruction if the address information concerning the address of the software interrupt instruction resulting in the generation of the exception corresponds to an address in a user area which includes the applications software.

12. A virtual machine for operating, on a base machine, applications software for a target machine, said virtual machine comprising:

a central processing unit;

an operating system, for the base machine, for causing said central processing unit to operate;

a virtual machine monitor operable on said central processing unit while said central processing unit is operating under said operating system, the virtual machine monitor having a target machine mode for selectively emulating an I/O operation of the target machine executing said applications software, and having a base machine mode for not emulating an I/O operation of the target machine executing said applications software; and key code translating means for translating, while said virtual machine monitor is operating in the target machine mode, a key code of a keyboard for the target machine into a key code of a keyboard for the base machine;

wherein said central processing unit has associated therewith a memory space including a system area including said operating system for said base machine, and a user area including said applications software for said target machine; and wherein said virtual machine monitor includes means for causing the key code translation not to be carried out if an I/O access request concerning the key code originated from an address in said system area, and for causing the key code translation to be carried out if an I/O access request concerning the key code originated from an address in said user area.

13. A virtual machine according to claim 12, wherein the key code translation is carried out by translating input parameters for a BIOS (Basic Input Output System) call for said target machine issued by said applications software for said target machine into corresponding input parameters for a BIOS call of said base machine, issuing the BIOS call of said base machine with said corresponding input parameters, and translating output parameters obtained in response to the issued BIOS call into corresponding output parameters for the BIOS call of said target machine, and returning said corresponding output parameters to said applications software for said target machine.

* * * * *